Feb. 28, 1933.  G. A. NELSON  1,899,900
FOLDING BOAT AND TRAILER CARRIER THEREFOR
Filed May 9, 1932  2 Sheets-Sheet 1
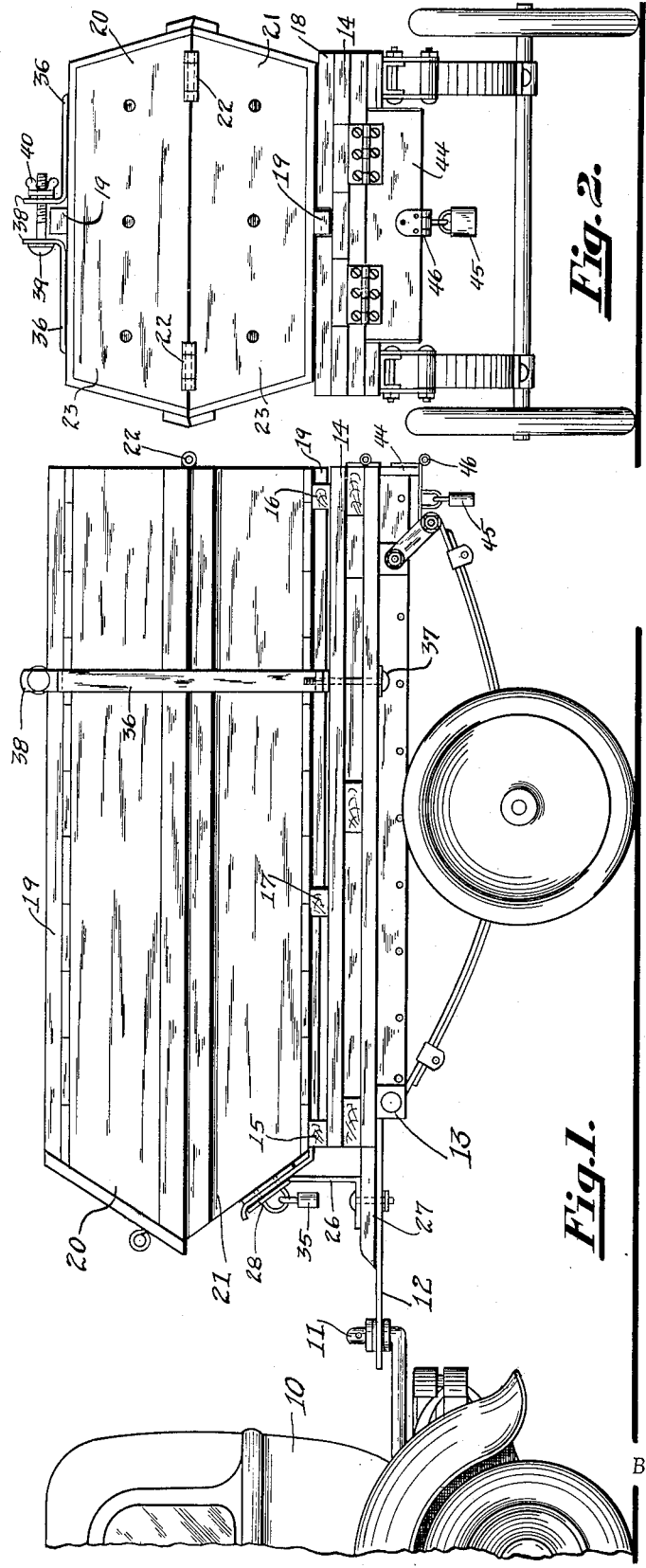
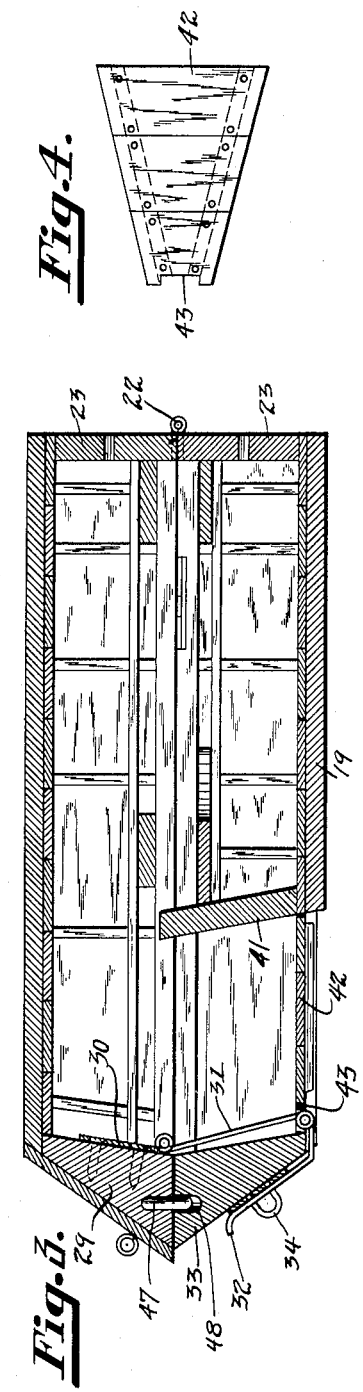
INVENTOR.
GEORGE A. NELSON.
BY
M. F. Woolard
ATTORNEY.

Feb. 28, 1933.   G. A. NELSON   1,899,900
FOLDING BOAT AND TRAILER CARRIER THEREFOR
Filed May 9, 1932   2 Sheets-Sheet 2

INVENTOR.
GEORGE A NELSON
BY
ATTORNEY.

Patented Feb. 28, 1933

1,899,900

UNITED STATES PATENT OFFICE

GEORGE A. NELSON, OF WAUWATOSA, WISCONSIN

FOLDING BOAT AND TRAILER CARRIER THEREFOR

Application filed May 9, 1932. Serial No. 610,074.

The present invention relates to folding boats combined with a motor vehicle trailer carrier therefor, with devices on both the boat and carrier which co-operate in securing the boat in fixed position upon the carrier, to thus insure easy transportation of the boat in overland trips.

The invention has been especially designed to meet the requirements of tourists, who in their travels discover attractive places for pitching a tent, but which offer no facilities in the way of a boat. It is also well adapted to employment by persons owning camps or lodges on bodies of water in remote sections, which are occupied only during the vacation season. In the latter circumstances, a boat at the camp is necessary, for the pleasure and convenience of the vacationists, but possession of the boat would probably change in the interim of the vacation periods, were the boat left at the camp in the expectation that it would be found there in the next season.

It has been my purpose to provide a construction which will enable the tourist or camp owner on vacation to transport a boat in a most convenient manner, while traveling. The boat is divided transversely at its middle, and the two sections are hinged one to the other so that they may be folded to occupy only one-half of the length of the boat, and easily unfolded, with provisions for securing the sections in fixed relation to constitute a boat which is very serviceable. In this manner, I overcome the difficulties encountered in the transportation of a boat of unitary construction.

The trailer carrier is especially constructed to receive the folded boat, and is provided with means for cooperating with means on the boat to secure the folded sections in position upon each other, and to the co-operating means on the trailer carrier.

The foregoing statement outlines the nature and purposes of my invention. In the matter which follows, I will describe the invention in the embodiment shown in the drawings, and in the appended claims will point out the novelty residing therein.

In the accompanying drawings:

Figure 1 is a view in side elevation showing my invention in folding boats and trailer carriers therefor, in connection with an automobile as part of the tourist's or vacationist's equipment.

Fig. 2 is a view in rear elevation, looking from the right of Fig. 1.

Fig. 3 is a central vertical sectional view, lengthwise of the boat, showing the latter in its folded position, and illustrating some of the details of construction.

Fig. 4 is a plan view of a removable floor board associated with the stern of the boat, for purposes which later will be described.

Figure 5:
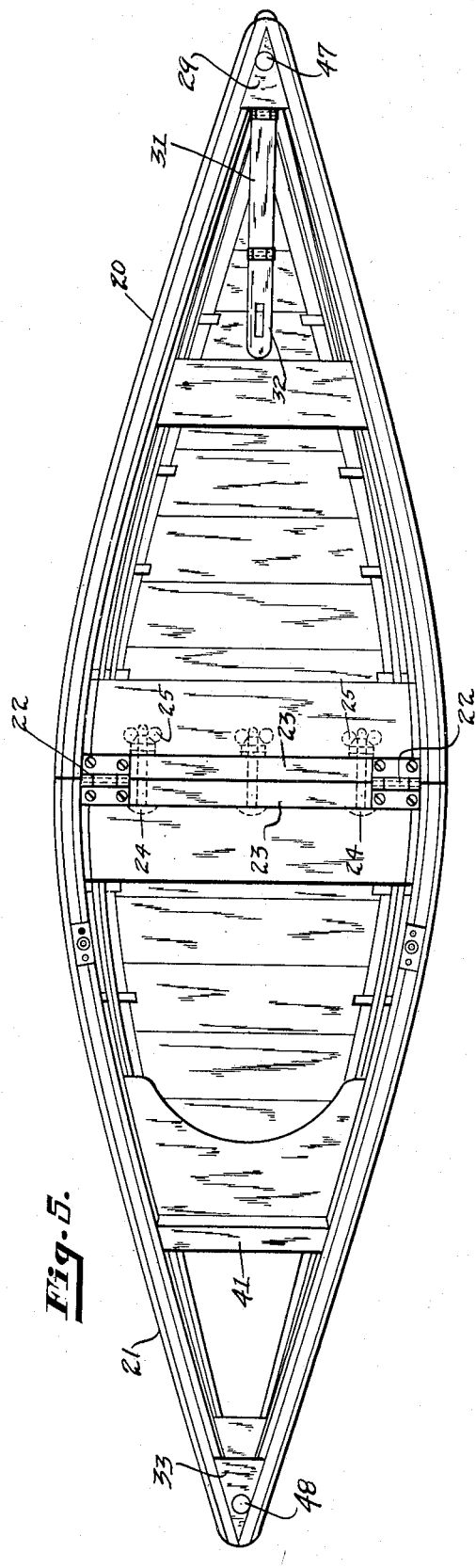
Fig. 5 is a plan view of the boat with the sections opened up and bolted together, and in condition for use.

In the drawings, the numeral 10, Fig. 1, indicates the rear end of an automobile provided with means 11 for connection with the tongue 12 of the carrying trailer 13. The latter, as usual, is a two wheeled affair provided with a bed or floor 14. A front batten strip 15, a rear batten strip 16, and an intermediate batten strip 17, are secured to the floor, transversely of the flooring boards. The strips 16 and 17 are severed at an intermediate point, and are spaced at their opposed ends, so as to form aligned guides 18, in which is received the keel 19 of the lower or rear end section of the folded boat. The keel does not extend to the stern of the boat, which latter rests with its bottom on the batten 15. At each side of the keel 19, the bottom of the boat rests on the battens 16 and 17, as shown in Figs. 1 and 2.

Figure 6:
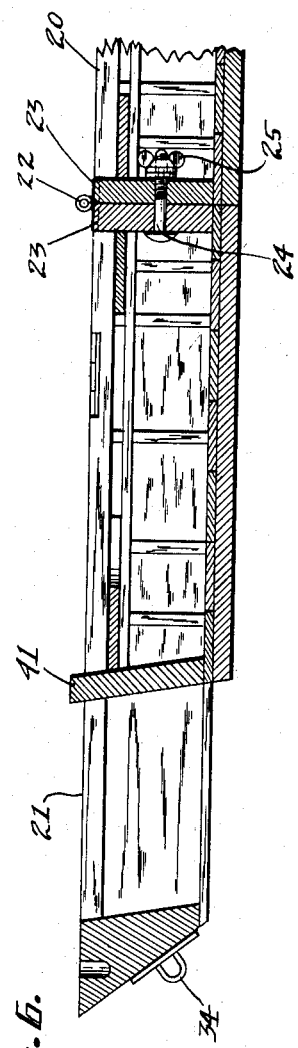
Fig. 6 is a longitudinal central sectional view through the rear part of the boat, showing the manner of securing the hinged sections together, so that the boat is in condition for service.

As shown in Figs. 1, 3, 5 and 6, the boat is composed of a front section 20 and a rear section 21, which parts are hinged together as at 22. The abutting ends of the hinged sections carry fixed division plates 23, which are provided with a suitable number of aligned bores through which may be passed securing bolts 24, provided with wing nuts 25, to form a simple and expeditious method of securing the hinged sections of the boat together in a firm manner.

A post rises from the front end of the drawbar 27 of the trailer carrier 13, the upper end of the said post being bent forwardly and provided with an elongated eye 28, for a purpose which later will be described. To the filling block 29 in the prow of the boat, the plate of a double jointed hasp 30 is attached, the intermediate link 31 of which has a length approximately equal to the depth of the boat. The hasp or locking section 32, is pivoted at one end to the outer end of the intermediate section 31, and is adapted, as the boat sections are folded, to pass through an opening in the bottom of the rear section of the boat. The hasp is curved so as to pass around the block 33 in the stern of the boat, and receive in the eye thereof the staple 34 attached at the stern of the boat. When the folded boat has been positioned upon the trailer carrier as described, the staple 34 will be passed through the eye 28 of the post 26, and the parts secured by means of a padlock 35.

The keel 19, resting in the guides 18, will prevent lateral movement of the folded boat, in the sidesway of the trailer carrier. At opposite points on the tapering sides of the boat sections, metal straps 36, 36, are secured to the bed of the trailer carrier by bolts 37, one of which is shown in Fig. 1. The free ends of the said straps, bent toward each other over the bottom of the upper section of the folded boat, are provided with upstanding parallel ears 38, 38, which are drawn toward each other to cause the strap to embrace the sides and bottom of the boat, by means of a bolt 39 passed through aligned perforations in the ears 38, and provided with a wing nut 40, to fasten the folded boat securely in position upon the trailer carrier. The upstanding ears 38, 38, are permitted to remain spaced sufficiently to receive between them the keel 19 of the upper section of the folded boat. By means of these devices, the boat is held against accidental displacement from its position upon the trailer carrier. The straps 36 will pivot around the bolts 37, to permit the folded bolt to be positioned upon the trailer carrier.

Back of the stern board 41, the bottom of the boat is cut away, so as to permit an outboard motor to be attached to the stern board, and the propeller thereof passed through the opening in the bottom and into the water.

When a motor is not used, the opening described in the bottom of the boat, may be temporarily closed by a removable bottom section 42, shown in Fig. 4. With such bottom section in position, the compartment thus provided may be used as a receptacle for fish, or for other purposes as desired. In order to accommodate the passage of the section 32 of the hasp through the bottom of the boat, when the removable section 42 is positioned therein, the adjacent end of the said section 42 may be notched as at 43.

The space inside of the folded boat may be utilized for storage of camp equipment, or other articles, as may be also the compartment under the floor of the trailer carrier, as shown in Figs. 1 and 2. The compartment last mentioned may be closed by the hinged door 44, and secured by a padlock 45, engaged with the staple of a hasp 46.

The trailer carrier is so constructed that it may be readily converted into a sleeping place, by inserting tent poles in sockets formed in the bed of the trailer carrier, and arranging a tent cover thereover.

The block 29 in the front end of the boat is provided with a fixed doweling pin 47, adapted, when the boat sections are folded together, to enter a socket 48 in the block 33 of the rear section, so as to align the sections and prevent their relative lateral movements.

The boat may be constructed of either wood or metal, or of both.

Having thus described my invention, what I claim and desire to secure by Letters Patent of the United States, is:

1. A folding boat comprising two hinged sections adapted to be folded one upon the other, a hasp fastened to one section and adapted to pass through the other section, and locking means at the outer side of the boat and engaged by the hasp for securing the hinged sections in folded relation.

2. A folding boat comprising two hinged sections adapted to be folded one upon the other, in combination with a carrier for the same and a post upon the said carrier, a hasp fastened to one section of the boat and adapted to pass through the other section, and locking means at the outer side of the boat and engaged by the hasp, and with the said post, for securing the hinged connections in folded relation upon the carrier.

3. A folding boat comprising a prow section and a stern section hinged together and adapted to be folded one upon the other, the stern section being provided with an opening at the bottom thereof, a hasp attached to the prow section and passed through the opening in the stern section, and locking means disposed upon the outer side of the stern section, for holding the hinged sections in folded relation.

4. A folding boat comprised of two hinged sections adapted to be folded one upon the other, in combination with a transporting carrier therefor, the bed of the said carrier being provided with transversely extending divided battens the opposed ends of which are spaced to form aligned guides for the keel of the boat, means for locking the sections in folded relation to the said carrier, and means attached to the latter and passing about the boat to hold the same in position upon the carrier.

In testimony whereof, I have signed my name at Milwaukee, this 26th day of March, 1932.

GEORGE A. NELSON.